Sept. 15, 1953   H. L. KNUDSEN   2,652,041
FUEL FEEDING APPARATUS FOR INTERNAL-COMBUSTION ENGINES
Filed April 8, 1948   6 Sheets-Sheet 1

INVENTOR.
Hans L. Knudsen,
BY
Davis, Lindsey, Hibben & Noyes
Attys.

Sept. 15, 1953     H. L. KNUDSEN     2,652,041
FUEL FEEDING APPARATUS FOR INTERNAL-COMBUSTION ENGINES
Filed April 8, 1948     6 Sheets-Sheet 2

Fig. 2.

INVENTOR.
Hans L. Knudsen,
BY
Davis, Lindsey, Hibben + Noyes
Attys.

Sept. 15, 1953  H. L. KNUDSEN  2,652,041
FUEL FEEDING APPARATUS FOR INTERNAL-COMBUSTION ENGINES
Filed April 8, 1948  6 Sheets-Sheet 5

INVENTOR.
Hans L. Knudsen,
BY
Davis, Lindsey, Hibben + Noyes
Attys.

Patented Sept. 15, 1953

2,652,041

UNITED STATES PATENT OFFICE 2,652,041

FUEL FEEDING APPARATUS FOR INTERNAL-COMBUSTION ENGINES

Hans L. Knudsen, Columbus, Ind., assignor to Cummins Engine Company, Inc., Columbus, Ind., a corporation of Indiana Application April 8, 1948, Serial No. 19,853

4 Claims. (Cl. 123—140)

The invention relates generally to the control of fuel for an internal combustion engine of the multi-cylinder type.

The general object of the invention is to provide novel fuel feeding apparatus for an internal combustion engine, which is capable of delivering uniform quantities of fuel to the respective cylinders of the engine, which is adapted for relatively high speed operation, and by which the rate of feed of the fuel may be accurately controlled.

Another important object is to provide fuel feeding apparatus of the foregoing character, in which the rate of feed of the fuel is controlled by a novel mechanism operated by a combined governor and manual control.

A more specific object is to provide fuel feeding apparatus of the foregoing character, in which a fuel metering pump draws fuel from a source of fuel under pressure through a distributor and delivers it back through the distributor to the respective cylinders, the distributor being of novel disc type construction utilizing separate discs for the intake to and the discharge from the metering pump.

Another of the more specific objects is to provide, in fuel feeding apparatus of the foregoing character, novel mechanism for actuating the fuel metering pump and for varying the stroke thereof to vary the quantity of fuel supplied to the cylinders and thus control the speed of the engine.

A further specific object is to provide, in fuel feeding apparatus of the foregoing character, novel linkage for connecting the combined governor and manual control with the mechanism for varying the stroke of the fuel metering pump.

Still another object is to provide, in fuel feeding apparatus of the foregoing character, a novel overspeed stop device which may be either automatically and manually operated or merely manually operated to suit the particular usage of the engine.

Other objects and advantages will become apparent from the following description taken in connection with the accompanying drawings, in which.

A fuel feeding apparatus embodying the features of the invention is adapted to feed fuel to the cylinders of a multi-cylinder internal combustion engine, particularly of the Cummins-Diesel type. While, in the drawings, I have shown apparatus adapted for use with a six-cylinder engine of this character, the invention, of course, is not limited to this particular number of cylinders but may be used with any multi-cylinder engine. The apparatus is also adaptable for use with either a two- or four-cycle engine of this type.

General description of the apparatus

In the preferred construction, the apparatus is adapted to be mounted on the side of the engine and to be driven thereby so as to establish a timed relation between the operation of the parts of the apparatus with the operation of the engine itself. The apparatus is enclosed in housing structure comprising a pair of housing members, one of which is superimposed upon the other, the lower housing member being indicated at 20 (see Figs. 1 and 2) and the upper housing member being indicated at 21. Suspended from the lower housing member 20 is a charging unit, indicated generally at 22. The lower housing unit 20 is provided with flanges 23 at its respective ends, by which the entire structure may be secured to the engine.

Journaled in the lower housing member 20 is a main drive shaft 24 having a drive connection with the engine so that the parts of the apparatus are driven in proper timed relation. The driving connection in the present instance is shown as a coupling member 25 mounted on the shaft 24 externally of the lower housing member 20. The coupling member 25 is adapted to connect with another coupling member (not shown) driven at the speed of the crankshaft of the engine. In the present instance, the main drive shaft 24 is operated at the same speed as the crankshaft of the engine, for reasons which will more fully appear hereinafter. The other end of the shaft 24 extends into a flange member 28 secured to the lower housing member 20 and is adapted for connection with a tachometer. When the tachometer is not used, a cap 29 is placed over the opening in the flange member 28 in which the end of the shaft 24 is located.

Generally described, the present apparatus comprises a charging unit 22 which draws fuel from a fuel tank 26 (see Fig. 13) and supplies such fuel under pressure to a distributor. The distributor is of the rotary disc type and comprises two sections, one section being a suction disc section, indicated generally at 27, and the other section being a discharge disc section 30. The fuel under pressure from the charging unit 22 is intermittently admitted through the suction disc section 27 to a variable delivery metering pump, indicated generally at 31. The metering pump 31 is of the piston and cylinder type and the suction disc section is timed to admit the fuel during the suction stroke of the metering pump 31. During the delivery stroke of the metering pump 31, the suction disc section 27 is closed to the flow of fuel so that the discharge from the pump is conducted to the delivery disc section 30, which functions to deliver the fuel to the respective engine cylinders.

The quantity of fuel delivered on each stroke of the metering pump 31 is controlled both by a governor and a manual control with the governor functioning at a low range and a high range and the manual control functioning through the intermediate range. The control apparatus also includes an overspeed stop device, either manually or automatically operated, by which the supply of fuel to the engine may be cut off in case of excessive speed.

*Fuel charging unit*

Figure 1:
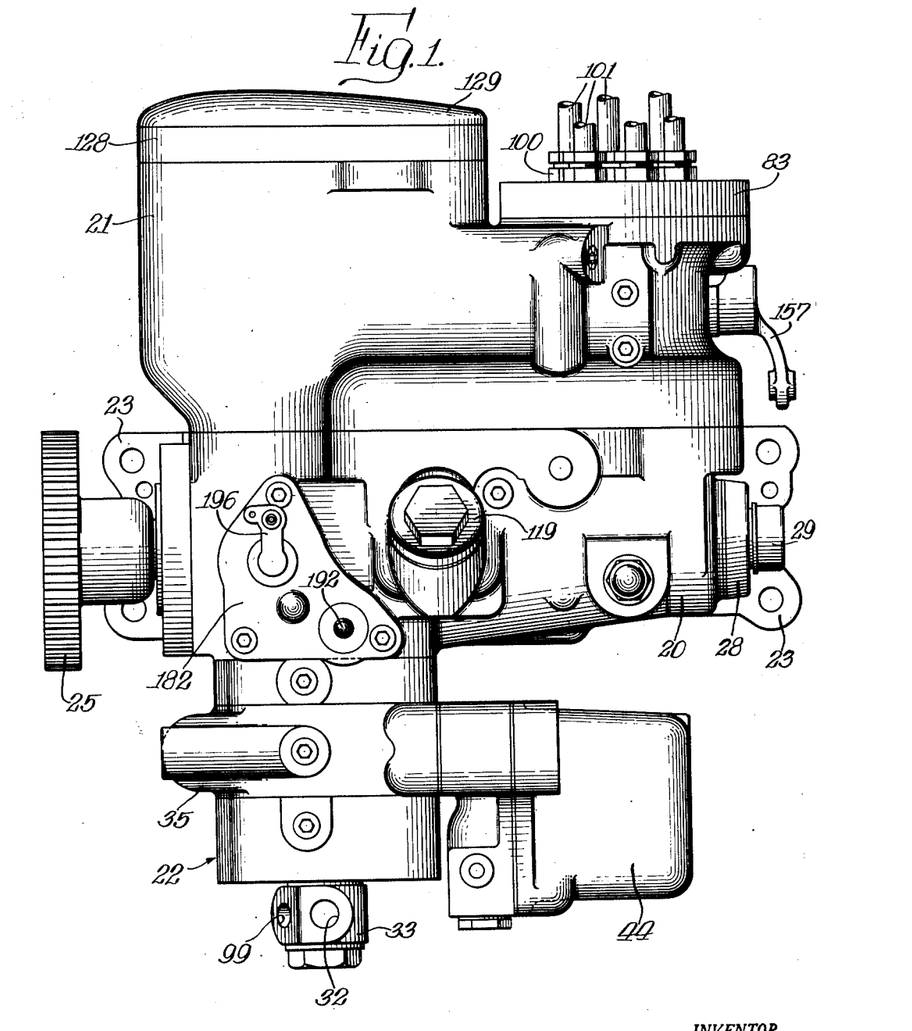
Figure 1 is a side elevational view of a fuel feeding apparatus embodying the features of the invention.
Figure 2:
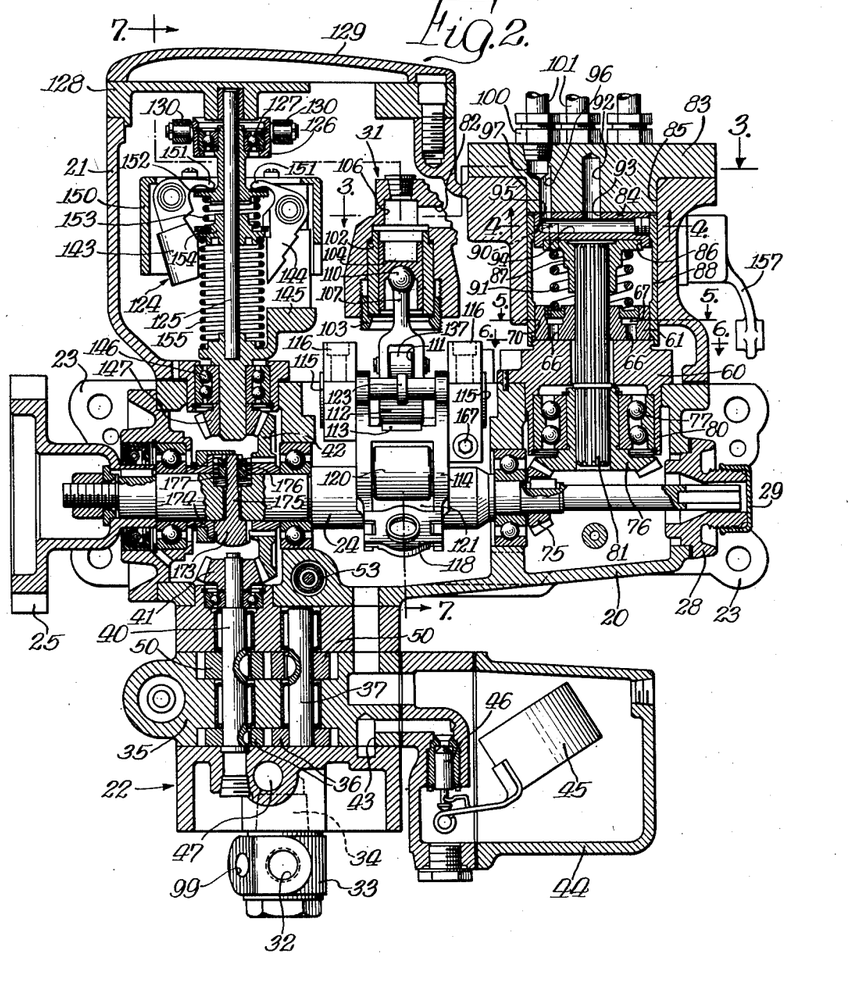
Fig. 2 is a longitudinal vertical sectional view of the apparatus shown in Fig. 1.
Figure 13:
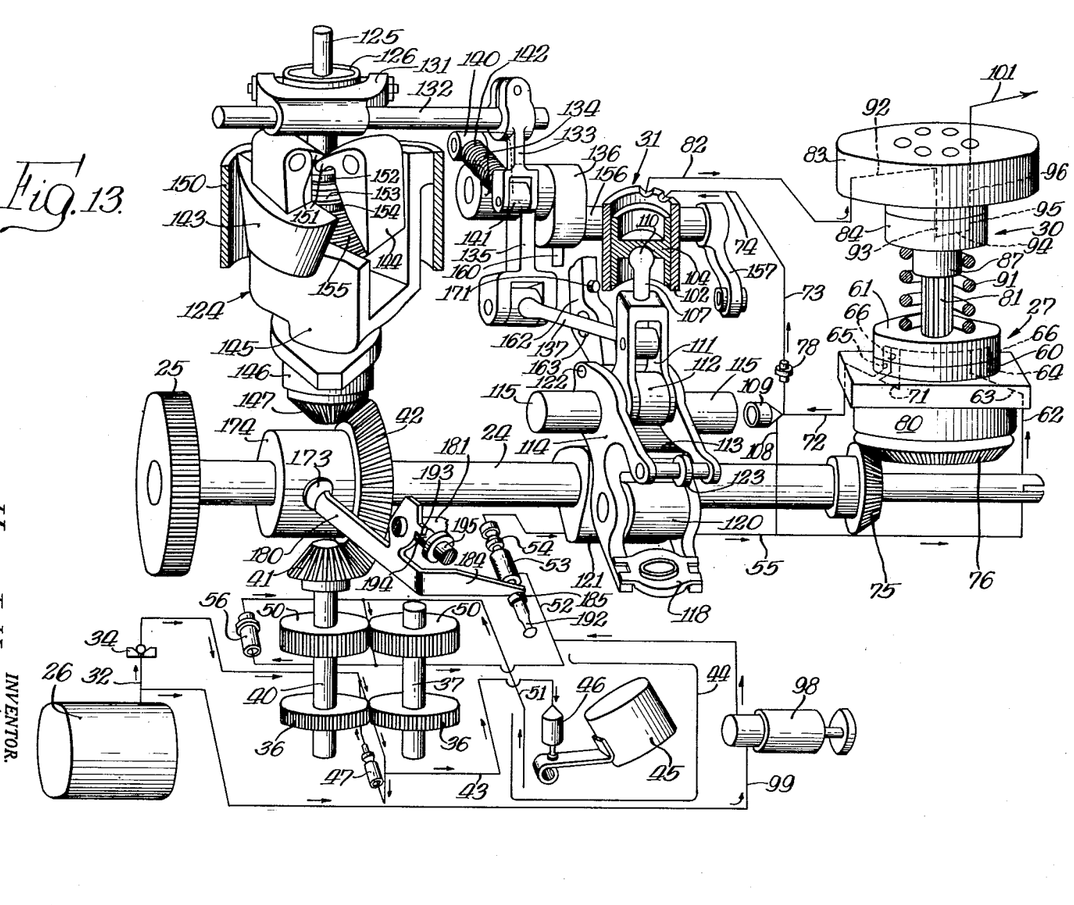
Fig. 13 is a diagrammatic view of the entire fuel feeding apparatus.

The fuel charging unit, as heretofore mentioned, is adapted to draw fuel from the fuel tank 26 and comprises low and high pressure pumps, which are shown as being of the gear type. Thus, as shown in Figs. 1, 2 and 13, fuel is drawn from the tank 26 through a line 32, the latter being connected to a fitting 33 provided at the lower end of the charging unit 22. The flow of fuel through the line 32 is controlled by a check valve 34, preferably of the ball type. The line 32 connects with a pump body 35 in which a pair of gears 36 comprising the low pressure pump are located. One of the gears 36 is mounted on an idler shaft 37 journaled in the pump housing 35, while the other gear 36 is mounted on a drive shaft 40 extending upwardly from the pump housing 35 and into the lower housing 20. At its upper end, the shaft 40 is provided with a bevel pinion 41 meshing with a bevel gear 42 mounted on the main drive shaft 24 of the apparatus.

Fuel delivered by the low pressure gear pump 36 is conducted through a line 43 for discharge into a float chamber 44. The level of fuel within the float chamber 44 is controlled by a float 45 which operates a float valve 46 controlling the flow of fuel through the line or passage 43. The parts are so arranged that when the level of fuel within the float chamber 44 reaches a predetermined level, the valve 46 is closed to stop the flow of fuel through the passage 43. The pump 36, however, continues to operate and a by-pass valve 47 is provided to permit the discharge of fuel from the low-pressure pump 36 to return to the intake or suction side thereof without passing into the float chamber 44.

Figures 3, 4, 5, 6:
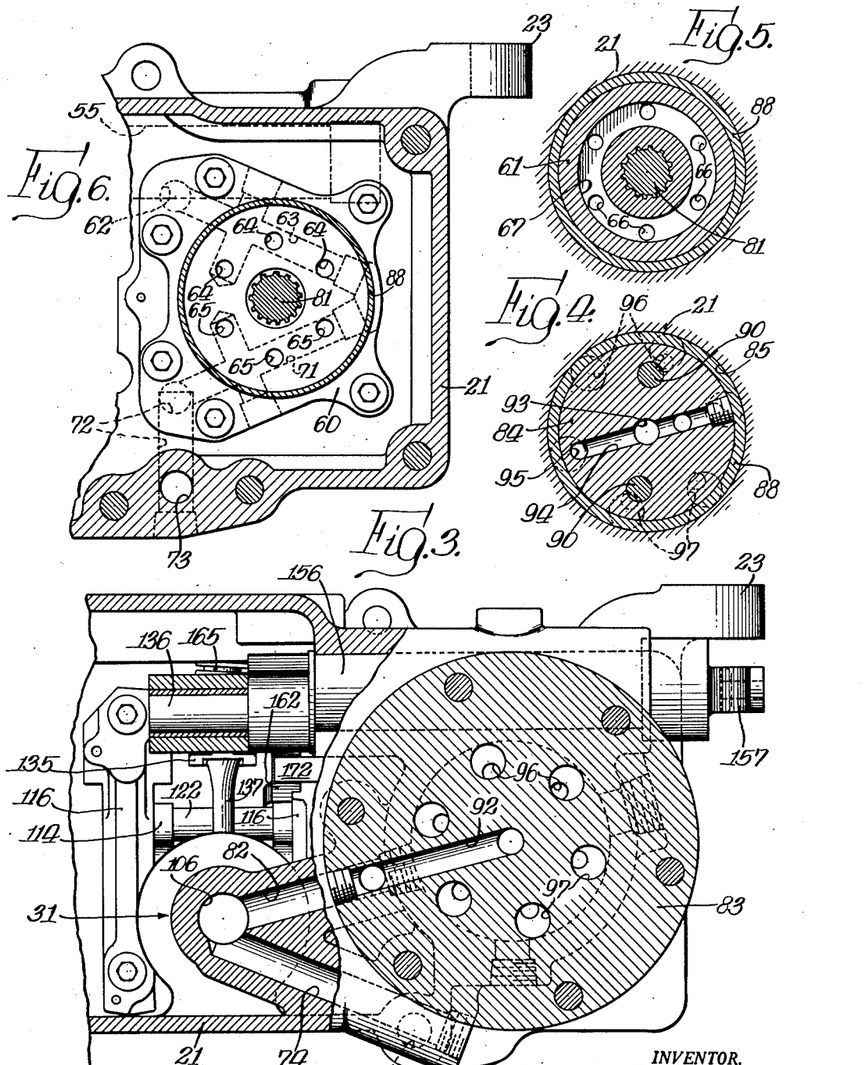
Fig. 3 is a fragmentary horizontal sectional view taken on the line 3—3 of Fig. 2.
Fig. 4 is a fragmentary horizontal sectional view taken on the line 4—4 of Fig. 2.
Fig. 5 is a fragmentary horizontal sectional view taken on the line 5—5 of Fig. 2.
Fig. 6 is a fragmentary horizontal sectional view taken on the line 6—6 of Fig. 2.
Figures 7, 8:
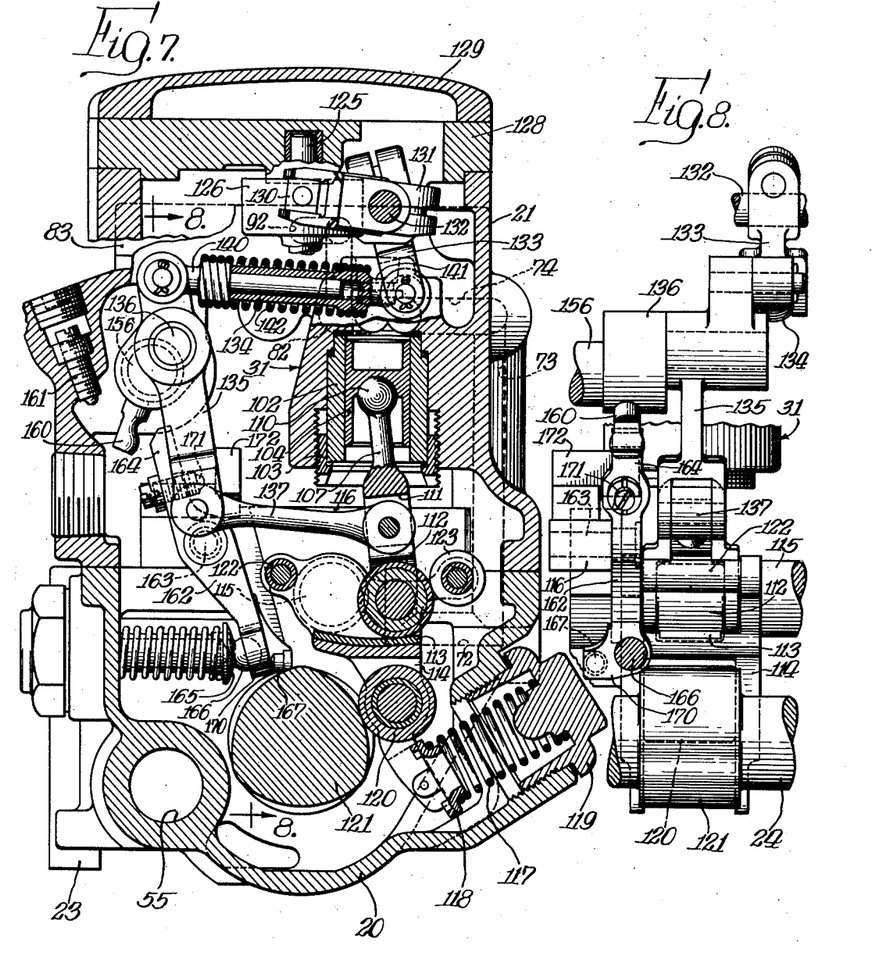
Fig. 7 is a transverse vertical sectional view taken on the line 7—7 of Fig. 2.
Fig. 8 is a fragmentary elevational view taken on the line 8—8 of Fig. 7.
Figure 9:
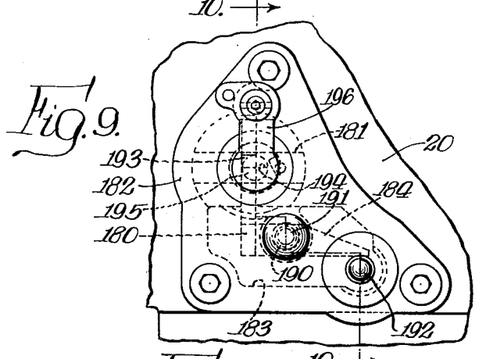
Fig. 9 is a fragmentary side elevational view of a portion of the apparatus as shown in Fig. 1.
Figure 10:
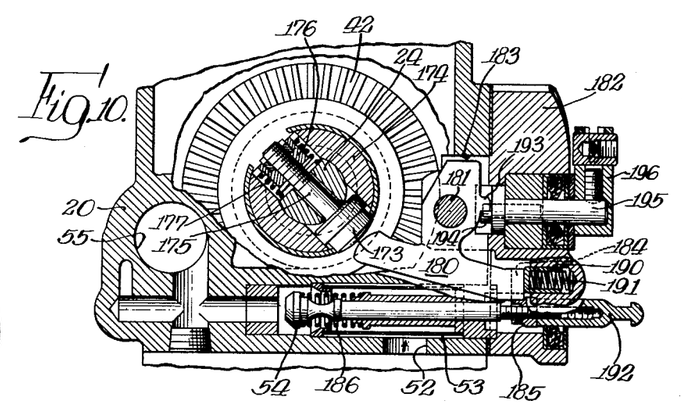
Fig. 10 is a fragmentary sectional view taken on the line 10—10 of Fig. 9.

Fuel from the float chamber 44 is withdrawn through a line 51 by the high-pressure gear pump comprising gears 50 located in the pump housing 35 and mounted on the shafts 37 and 40. The discharge from the high-pressure gear pump 50 is conducted by a line 52 through a filter 53 and an overspeed stop valve 54 which will be more fully described hereinafter. From the overspeed stop valve 54, the fuel is conducted to a surge chamber header 55 comprising an enlarged and elongated passage formed in the lower housing member 20, as illustrated in Figs. 6, 7 and 10. The surge chamber header 55 is connected with the distributor, and particularly to the suction disc section 27 thereof, to supply fuel to the metering pump 31.

Under "no load" conditions when the engine requires very little fuel, the high-pressure gear pump 50 tends to build up pressure in the line or passage 52 and the surge chamber header 55. To prevent excess pressure therein, a pressure control valve 56 is provided, which connects the discharge side of the gear pump 50 with the intake side so that some of the fuel can be by-passed therethrough. Thus, a constant pressure of fuel is maintained within the surge chamber header 55 to supply the metering pump 31 through the suction disc section 27 of the distributor.

*The distributor*

As heretofore stated, the distributor is adapted to admit fuel from the surge chamber header 55 intermittently to the variable delivery metering pump 31 upon the suction stroke thereof and to distribute the fuel discharged by the metering pump 31 to the respective cylinders, the distributor having the two rotary disc sections 27 and 30 for these respective functions. The suction disc section 27, of course, is open for the flow of fuel only when the distributing disc section 30 is closed, and vice versa. Each of the distributor sections comprises a fixed or stationary disc and a rotatably driven disc in face-to-face engagement, with passages formed in the respective discs to provide the desired connections therebetween.

As shown in Figs. 2, 6 and 13, the suction disc section 27 has a fixed or stationary disc 60 located in the upper housing member 21 but seated on the upper face of the lower housing member 20. The upper face of the stationary disc 60 is in engagement with a rotatably driven disc 61. Fuel from the surge chamber header 55 is conducted into the stationary disc 60 through an upwardly extending passage 62 (see Figs. 6 and 13), which in turn communicates with an angularly shaped passage 63 located internally in the stationary disc 60. Extending upwardly to the upper face of the stationary disc 60 are a plurality of apertures 64 arranged in annular and equally spaced relation to each other and to another set of apertures 65, the apertures 64 being located on one side of the center line of the disc, while the apertures 65 are located on the other side.

The apertures 64 are adapted to be intermittently moved into register with an annular series of apertures 66 (see Figs. 2, 5 and 13) provided in the rotatable disc 61. The apertures 66 communicate with an annular passage 67 in the upper or rotatable disc 61. The annular passage 67 is preferably formed by cutting a groove in the disc 61 and then closing it by a channel-shaped ring 70. The apertures 66 are thus all in communication with each other and intermittently register with the apertures 64 in the lower or stationary disc 60. The apertures 66 also are adapted to register with the apertures 65 in the lower disc whenever any of them is in registry with the apertures 64, so that communication between the apertures 64 and 65 is established through the rotating disc 61 when the apertures in the respective discs are in registry. When the apertures in the two discs are out of registry, then, of course, no fuel can flow from the apertures 64 through the rotating disc 61 to the apertures 65.

The apertures 65 in the stationary disc 60 extend downwardly to communicate with an angularly shaped passage 71, which in turn communicates with a U-shaped passage 72 formed in the lower housing member 20. The U-shaped passage 72 communicates with an upwardly extending passage 73 (see Figs. 3 and 13) formed in the upper housing member 21 and having an upper horizontally extending portion 74 opening into the upper end of the cylinder of the metering pump 31. A check valve 78 (see Fig. 13) may be mounted in the passage 73.

The rotating discs of the two distributor sections as well as the metering pump 31 are adapted to be driven in timed relation to the engine. For driving the rotating discs of the distributor sections, a bevel pinion 75 (see Figs. 2 and 13) is mounted on the main drive shaft 24 and meshes with a bevel gear 76. The bevel gear 76 is journaled in antifriction bearings 77 carried in a downwardly extending sleeve portion 80 of the stationary disc 60. The bevel gear 76 has a spline connection with a vertically extending shaft 81 extending upwardly through the stationary disc 60. The shaft 81 is splined throughout its length and thus has a driving connection with the rotatable disc 61 so that the latter is rotated in timed relation to the operation of the engine.

On the discharge stroke of the metering pump 31, the rotatable disc 61 has rotated sufficiently to move the apertures 66 out of registration with the apertures 64 and 65 so that no fuel can pass reversely therethrough. The fuel from the pump is, therefore, discharged through a passage 82 (see Figs. 3 and 13) extending horizontally in the upper housing member 21 and positioned at an angle to the passage 74. The passage 82 serves to conduct the fuel from the metering pump 31 to the distributing disc section 30 of the distributor. The distributing section 30, as in the case of the suction disc section 27, comprises a fixed or stationary disc 83 and a rotatable disc 84 in face-to-face engagement with each other. The stationary disc 83 in the present instance is located above the rotatable disc 84 and serves as a cap or cover to close a cavity 85 (see Fig. 2) in the upper housing member 21 in which the distributor is located. The rotatable disc 84, located immediately below the stationary disc 83, is provided with a counterbore 86 on its lower face in which a flange portion of a hub 87 is positioned. The hub 87 is carried on and has a splined connection with the upper end of the spline shaft 81 so that it is driven thereby. To provide a driving connection between the hub 87 and the rotatable disc 84, a pair of diametrically opposite driving pins 90 (see Figs. 2 and 4) extend upwardly from the flange of the hub 87 into the rotatable member 84. To hold the rotatable disc 84 in engagement with the stationary disc 83, and similarly to hold the rotatable disc 61 of the suction disc section 27 in engagement with its associated stationary disc 60, a coiled spring 91 is interposed between the two rotatable discs 61 and 84 to bear oppositely against them. The spring 91 thus forces the rotatable disc 61 downwardly against the stationary disc 60 and holds the rotatable disc 84 upwardly against the stationary disc 83 to prevent leakage of fuel between the engaging faces of the respective pairs of discs. Since the two rotatable discs 61 and 84 are both driven by the spline shaft 81, the spring 91 rotates with these two discs. In the particular arrangement shown in Fig. 2 of the drawings, the spring 91, at its upper end, bears against the flange of the hub member 87 while its lower end is seated in a groove in the ring 70 in the rotatable disc 61. The rotatable discs 84 and 61 may be enclosed by a sleeve 86 fitting within the cavity 85 in the upper housing member 21.

For the distribution of fuel discharged by the metering pump 31, it is to be understood that on each delivery stroke of the metering pump a metered quantity of fuel is to be delivered to one of the cylinders of the engine, as determined by the distributor disc section 30. To this end, the passage 82 for the discharge from the metering pump 31 has an upwardly extending portion at its outer end communicating with an inverted U-shaped passage 92 provided in the stationary disc 83 (see Figs. 2, 3 and 13). One arm of this U-shaped passage 92 is located centrally of the stationary disc 83 and is adapted to register with an aperture 93 provided in the upper face of the rotatable disc 84. The aperture 93 communicates with a radially extending passage 94 in the rotatable disc 84 and this passage is provided with an upwardly extending aperture 95 at its outer end.

The aperture 95, by the rotation of the disc 84, is adapted to be moved successively into registry with an annular series of vertically extending passages 96 provided in the stationary disc 83. There is one passage 96 for each cylinder of the engine, and these passages, at their upper ends, are eccentrically enlarged, as at 97, to receive a pipe fitting 100 for connecting pipes or tubes 101 extending to the fuel injectors for the respective engine cylinders. An injector of the type herein contemplated is disclosed in the Cummins Patent No. 2,190,015, granted February 13, 1940.

The rotation of the rotatable disc 84 is timed to move the aperture 95 into registry with one of the passages 96 on each discharge stroke of the metering pump 31, so that fuel will thereby be supplied to the respective cylinders of the engine. Such registry of the aperture 95 with one of the passages 96 occurs at a time when the apertures 66 in the lower rotatable disc 61 are out of registry with the apertures 64 and 65 in the lower stationary disc 60. Fuel is thus intermittently drawn into the metering pump 31 and discharged to the respective engine cylinders.

For priming the engine, a priming pump 98 (see Fig. 13) may be provided. The priming pump 98 has a line 99 connecting it to the fuel tank 26 so that fuel may be withdrawn directly therefrom. In the present instance, the line 99 is connected to the fitting 33, depending from the charging unit 22. The discharge side of the priming pump 98 connects with the line 52 extending to the filter 53 and through which the high-pressure gear pump discharges. Fuel from the priming pump 98 is thereby forced through the filter 53, the valve 54, and into the surge chamber header 55. From the latter, a branch line or passage 108 extends, which is connected to the passage 73 leading to the metering pump 31. A manually operated priming valve 109 controls the flow through the branch line 108 so that when the valve 109 is open, the fuel supplied by the priming pump 98 may be forced into the suction disc section 27 of the distributor through the passage 72, as well as into the metering pump 31 and the discharge disc section 30.

The metering pump 31

The quantity of fuel delivered to each cylinder through its injector on each power stroke of the engine is determined by the metering pump 31 to control the speed of operation of the engine. The metering pump 31 is thus of a variable delivery type. While the quantity of fuel delivered by the metering pump might be varied by providing a pump having a constant stroke with means for bleeding off predetermined portions of the fuel on each delivery stroke, I prefer in the present instance to utilize a variable-stroke pump to control the quantity of fuel delivered on each stroke. The pump in the present instance comprises a cylinder 102 (see Figs. 2, 7 and 13) mounted in a pocket formed in the upper housing member 21. The cylinder 102 is retained within such pocket by means of a nut 103 threaded in the housing member 21 and having a shoulder abutting the lower end of the cylinder 102. Operating within the cylinder 102 is a piston 104 which, in the present instance, is cupped at both ends. The piston 104 is urged downwardly on its intake stroke by the charging pressure of the fuel. The upper end of the cylinder has a reduced portion 106 and the intake and discharge passages 74 and 82 open into this reduced portion.

The piston 102 is adapted to be actuated on its discharge stroke by a pitman 107. To permit the pitman 107 to pivot relative to the piston 104, the upper end of the pitman 107 is ball-shaped, as shown at 110, to bear in a pocket formed in the lower cupped end of the piston.

The pitman 107 is adapted to be driven from the main drive shaft 24 by a novel drive structure which permits variation in the stroke of the piston from zero to a predetermined maximum to vary the quantity of fuel supplied to each cylinder, and thus to control the speed of the engine. Generally described, the pitman is adapted to be actuated by a lever operated in turn by a cam on the main drive shaft 24, with the pitman adjustable relative to the lever between a point which coincides with the pivotal axis of the lever where no motion is imparted to the piston, to a point at a predetermined maximum distance from the pivotal axis of the lever for the maximum stroke of the piston.

To accomplish this end, the pitman 107, at its lower end, is bifurcated as at 111 (see Figs. 2, 7 and 13) and carries a roller 112 journaled in its lower end. The roller 112 is adapted to engage a runway 113 in the form of an arcuate plate mounted between the side arms of a bifurcated rocker lever 114. Each arm of the bifurcated rocker lever 114 is provided with a trunnion 115 mounted in a bearing bracket 116 fixed in the lower housing member 20. To actuate the rocker lever 114, a cam roller 120 is mounted between the arms thereof at its lower end to engage a cam 121 formed on the main drive shaft 24. For a four-cycle engine where the fuel is to be delivered to each cylinder for every other revolution of the engine, the cam 121 is provided with one half the number of lobes as there are cylinders, with the main drive shaft 24 rotating at the same speed as the engine. In the present instance, the apparatus is shown as adapted for operation with a four-cycle, six-cylinder engine, and the cam 121, therefore, is provided with three lobes for actuating the rocker lever 114. The roller 120 is held in contact with the cam 121 by means of a spring 117 bearing at one end against a seating member 118 carried by the arms of the rocker lever 114 and at its other end against a cap 19 threaded in an opening in the lower housing member 20.

To vary the stroke of the piston of the pump 31 between zero and a predetermined maximum, the runway 113 extends from a point adjacent the pivotal axis of the trunnions 115 outwardly therefrom in a direction generally perpendicular to the pitman 107. The roller 112 journaled in the pitman 107 is adapted to be adjusted along the runway 113 from a point where its axis coincides with the axis of the trunnions 115 for zero fuel delivery, since at that point no reciprocation will be imparted to the piston 104, to a point adjacent the outer end of the runway 113 where maximum fuel delivery will occur. To limit such adjustment of the roller 112, the rocker lever 114 carries a pair of stops engageable by the roller 112, each stop comprising a bar mounted between the arms of the rocker lever 114. In the present instance, when the roller 112 is moved inwardly toward the axis of the trunnions 115, its position coincident with such axis is limited by a tubular member 122 (see Fig. 7) carried on a bar mounted in the two arms of the rocker lever 114. For the maximum fuel position of the roller 112, the stop comprises a flanged tube 123 mounted on a bar extending through the arms of the rocker lever 114 with the flange of the tube 123 engageable by the roller 112 at the desired maximum fuel delivery position. Thus, by shifting the roller 112 between its two limiting positions, the stroke of the piston 104, and consequently the quantity of fuel delivered by the metering pump 31, can be varied between zero and a maximum.

Control of the fuel delivery by the metering pump 31

As heretofore mentioned, the control of the fuel delivered on each stroke of the metering pump 31 is effected by a combined governor and manual control mechanism. The governor, indicated generally at 124 in Figs. 2 and 13, includes a vertically extending drive shaft 125 on the upper end of which is shiftably mounted a collar 126. The collar 126 is adapted to be shifted vertically in response to the action of the governor.

The collar 126 does not rotate with the governor drive shaft 125 but is journaled thereon by means of an antifriction bearing 127. Mounted at diametrically opposite points on the collar 126 is a pair of blocks 130 engaged in the arms of a yoke 131 (see Figs. 7 and 13). The yoke is rigidly connected to a rockshaft 132 located in the upper part of the upper housing member 21. The rockshaft 132 also carries an intermediate lever 133 to which is connected an extensible link 134 which is in turn connected to a main control lever 135. The main control lever 135 is pivotally supported by a manually adjustable eccentric 136 which will be more fully described hereinafter. The main control lever 135 in turn is connected by a link 137 to the pitman 107, the link 137 extending substantially at right angles to the pitman 107 so that, upon swinging movement of the main control lever 135, the pitman 107 will be swung about its ball connection with the piston 104 to move the roller 112 along the runway 113.

In the normal operation of the engine, assuming that the manual control has been set for a predetermined load, when the engine exceeds a predetermined maximum speed, the collar 126 is drawn downwardly on the shaft 125 to rock the yoke 131 and the rockshaft 132. This in turn swings the lever 133 which, through the link 134, actuates the main control lever 135 to swing the pitman to the left, as viewed in Fig. 7, so that the roller 112 thereon moves toward the pivotal axis of the rocker lever 114. Such adjustment of the pitman 107 reduces the stroke of the piston, since the roller 112 is moved toward the pivotal axis of the rocker lever 114, and less fuel is thereby delivered to the cylinders. Should the speed of the engine fall below the predetermined maximum, the collar 126 moves upwardly on the governor shaft 125 to actuate the control mechanism in the opposite direction, thereby moving the roller 112 of the pitman 107 outwardly along the runway 113 to increase the amount of fuel delivered to the cylinders of the engine. The main control lever 135, after one or two swings, stabilizes to hold the roller 112 in an adjusted position on the runway 113 so that constant delivery of fuel to the cylinders is thereby effected and the engine runs smoothly.

Under normal conditions, the link 134 functions as a non-extensible fixed link. However, under some circumstances, it is desirable to permit the link 134 to expand to prevent damage to other cooperating parts. For example, when a truck equipped with an engine having a fuel control apparatus of the character herein described moves on a downhill grade, the manual control eccentric 136 is set for idle speed. However, because of the grade, the engine speed may be greater than normal idling speed. The governor, in such case, tends to reduce the quantity of fuel supplied to the engine and, through the linkage just described, shifts the roller 112 of the pitman 107 into engagement with the stop 122 which is the point where the axis of the roller 112 coincides with the axis of the trunnions 115 of the rocker lever 114. If the downgrade is sufficient to continue to increase the engine speed, the governor tends to shift the linkage still farther in the same direction. The roller 112, however, cannot be moved beyond the point of zero fuel delivery since at that point it is in contact with the zero fuel stop 122. Under such conditions, the link 134 is permitted to expand so that the rest of the linkage will not be damaged or broken.

To this end, the link 134 comprises a pair of members 140 and 141 (see Figs. 7 and 13) respectively connected to the main control lever 135 and the lever 133. The member 141 is tubular in form, while the member 140 is in the form of a plunger telescoped within the tubular member 141. To prevent the two members 140 and 141 from spreading apart under normal operation, they are connected by a spring 142 threaded at each end on the respective members. The spring 142 has a spring load of such size that during normal operation of the linkage, no expansion is permitted. However, under the circumstances just described, the spring 142 expands to permit the roller 122 to remain at its zero fuel position against the stop 122, while the rockshaft 132 and lever 133 are swung by the governor.

The governor 124 comprises a pair of low-speed governor weights 143 positioned on opposite sides of the drive shaft 125, and a pair of high-speed governor weights 144, also positioned at opposite sides of the governor shaft 125 but spaced 90° from the low-speed weights 143. The weights 143 and 144 are pivotally mounted on a rotating carrier 145 carrying the shaft 125. The upper end of the shaft 125 is steadied by a support 128 secured over an opening in the upper housing member 21 with a cover 129 secured over the support 128. The rotating carrier 145 is supported in an antifriction bearing 146 mounted in the lower end of the upper housing member 20 and has a bevel pinion 147 mounted on its lower end below the bearing 146 and meshing with the bevel gear 42 on the main drive shaft 24. The bevel gear 42, it will be recalled, is also utilized to drive the low- and high-pressure gear pumps of the charging unit 22. The governor is thus driven in a predetermined speed relation with the engine.

The rotating carrier 145, at its upper end, carries a retainer shell 150 which functions to limit outward swinging movement of the low-speed weights 143, as well as to limit outward swinging movement of the high-speed weights 144. The weights 143 and 144, at their upper ends, have inwardly extending arms 151 bearing on an outwardly extending flange portion of a collar 152. The collar 152 is slidably mounted on the governor shaft 125 and is secured to the antifriction bearing 127 supporting the collar 126. The weights 143 and 144, when swung outwardly by the action of centrifugal force, thus tend to move the collar 152 downwardly along the shaft 125 to actuate the collar 126. Downward movement of the collar 152 is resisted by a low-speed governor spring 153 bearing against an intermediate collar 154 mounted on the shaft 125 with the intermediate collar 154 bearing against a high-speed governor spring 155 seated on the rotatable carrier 145. In the lower ranges of speed, the low-speed governor weights 143, which are heavier than the high-speed weights 144, swing outwardly under centrifugal action to move the collar 152 downwardly on the shaft 125 compressing the low-speed spring 153. At a predetermined speed, the low-speed weights 143 engage the retainer shell 150 and are prevented from further outward movement. At the predetermined maximum, the high-speed governor weights 144 take over control of the mechanism and, upon moving outwardly to depress the collar 152, compress the high-speed governor spring 155. As the speed of the engine lessens, obviously the springs 153 and 155 expand to move the collar 152 upwardly and correspondingly operate the the linkage controlling the stroke of the piston 104 of the metering pump.

The hand control eccentric 136, as mentioned hereinbefore, pivotally supports the main control lever 135 and is adjustable to determine the speed at which the governor regulates the engine. The eccentric 136 is formed on a shaft 156 (see Figs. 3, 7 and 13) rotatably mounted in the upper housing member 21 and extending externally thereof at the right-hand end of the housing member 21, as viewed in Figs. 2 and 3. On the outer end of the shaft 156 is a manually operable lever 157. By rotating the shaft 156 counterclockwise, as viewed in Fig. 7, the eccentric 136 moves the pivotal axis for the main control lever 135 to the left, the connection of the link 134 with the main control lever 135 functioning as a fulcrum in this instance. The lower end of the main control lever 135, therefore, is swung to the left to move the roller 112 of the pitman 107 towards its zero fuel position. Thus, swinging the shaft 156 by the manual control lever 157 in this manner will reduce the speed of the engine while rotation of the shaft 156 in a clockwise direction, as viewed in Fig. 7, will shift the roller 112 toward its maximum-speed position to increase the speed of the engine. At any point of adjustment of the manually operated lever 157, the governor assumes control if the engine exceeds the predetermined maximum speed.

Rotative movement of the shaft 156 and the consequent shifting of the eccentric 136 is limited both for maximum speed and for zero speed or stop position. The apparatus also includes means for indicating when the shaft 156 is turned to the idle-speed position for the engine, so that the manually operated lever 157 may be readily turned to an idle-speed position without necessitating an accurate adjustment thereof each time that it is operated. To effect these results, the eccentric 136 carries an abutment in the form of a radially extending pin 160 (see Figs. 7 and 8). To limit the swinging movement of the eccentric 136 to a maximum-speed position, a stop comprising a screw 161 is mounted in the upper housing member 21 in the path of the pin 160 for engagement thereby at the maximum-speed position. The screw 161 thus limits the swinging movement of the eccentric 136 in one direction. The screw 161 may be adjusted to properly determine this position, which, of course, corresponds to the point at which the roller 112 on the pitman 107 engages the maximum-speed stop bar 123.

When the eccentric 136 is swung in the opposite direction to move the roller 112 toward the zero-speed position, means is provided to be engaged by the pin 160 at the idle-speed position for the engine. In the present instance, such means comprises an idling lever 162 pivotally supported at 163 by one of the bearing brackets 116 carrying the trunnions 115 of the rocker lever 114. The idling lever 162 extends in a generally vertical direction and its upper end 164 is positioned in the path of the pin 160 for engagement thereby at the idling-speed position. To determine this position of the lever 162, the lower end of the lever is engaged by a spring-pressed plunger 165 having a ball-shaped head 166 fitting in a socket in the lower end of the lever. The spring-pressed plunger 165 tends to swing the lever 162 counterclockwise, as viewed in Fig. 7. To prevent the lever 162 from being swung beyond the proper point for engagement by the pin 160 at idling speed, a stop in the form of a screw 167 is mounted in the lower portion of the bearing bracket 116 to engage a sidewardly projecting portion 170 on the lower end of the lever 162. By adjustment of the screw 167, the proper position of the idling lever 162, and consequently the position at which it is engaged by the stop pin 160 for idling speed, is determined. The manually operable lever 157 may, therefore, be swung to rotate the eccentric 136 to the proper position for idling speed of the engine.

To shut off the flow of fuel to the engine by means of the manually operable lever 157, further swinging movement of the eccentric 136 in a counterclockwise direction, as seen in Fig. 7, causes the pin 160 to swing the idling lever 162 clockwise away from the stop screw 167 to move the spring-pressed plunger 165 to the left. To prevent movement of the eccentric 136 beyond the position where the roller 112 is in the zero-speed position and in engagement with its stop 122, the end 164 of the lever 162 is provided with a screw 171 adapted to engage a block 172 mounted on the bearing bracket 116. By adjustment of the screw 171 in the upper end 164 of the lever 162, the proper position for the lever corresponding to the zero fuel position of the roller 112 is determined. The eccentric 136 is thus limited in its swinging movement between the zero-feed position and the maximum-feed position with engagement of the stop 160 with the lever 162 effected at the point of idling speed to indicate clearly to the operator when such idling-speed position is attained.

*Overspeed stop device*

The fuel feeding apparatus disclosed herein also includes as one of its features an overspeed stop device for shutting off the flow of fuel to the engine, should the engine attain an excessive speed. The overspeed stop device may be either automatically and manually operated or may be constructed for manual operation alone, depending upon the use to which the engine is put. For example, the combined automatic and manual control may be used in the case of an engine operating a generator, locomotive, power shovel, or any marine use. When the engine is used in a motor truck, however, an overspeed stop device which provides only for manual control is used since, if the engine attained an excessive speed when the truck was going downhill, it would be obviously undesirable to shut off operation of the engine at such time automatically. The overspeed stop device as shown herein is adapted to effect closure of the valve 54 located in the line 52 extending from the high-pressure gear pump 50 to the surge chamber header 55.

The combined automatically and manually controlled type of overspeed stop device is illustrated in Figs. 1, 2, 9, 10 and 13. To operate the device and effect closure of the valve 54, the centrifugal action of a weight is employed. Thus, as shown particularly in Figs. 2 and 10, a weight 173 is mounted in the hub 174 of the bevel gear 42. The weight 173 is provided with a stem 175 extending diametrically through the portion of the shaft 24 lying within the hub 174. The end of the stem 175 opposite the weight 173 is provided with a nut 176 having a flange engaging a spring 177 extending about the nut and located in a pocket formed in the hub 174 and shaft 24. The spring thus tends to draw the weight 173 inwardly relative to the shaft 24 and hub 174. When the speed of rotation of the shaft 24 exceeds a predetermined value, the weight 173 moves outwardly therefrom, against the action of the spring 177, in response to the centrifugal force exerted by such rotation.

Mounted adjacent the shaft 24 at the point where the weight 173 is located, is a detent 180. The detent 180 is generally T-shaped (see Fig. 10) and is pivotally supported by a pin 181 mounted in a bracket 182 secured on the face of the lower housing member 20 and extending through an aperture 183 therein. One end of the head of the T-shaped detent 180 lies in the path of the weight 173 to be engaged thereby when the latter moves outwardly from the shaft, causing swinging movement of the detent about the pin 181. The other end of the head of the T is provided with a laterally bent portion 184 engaging a shoulder 185 on a nut threaded on the stem of the valve 54. The valve 54 is urged towards its closing position by a coiled spring 186 so that the detent normally holds the valve in an open position against the action of the spring 186. However, when the weight 173 engages the detent 180 and swings it about its pivot pin 181, the laterally bent portion 184 moves away from the shoulder 185 to permit the spring 186 to close the valve 54.

When the valve 54 has been closed by the operation of the weight 173, it remains closed until manually reset in its open position. For this purpose, a plunger 190 is mounted in the bracket 182 and is urged into engagement with the laterally extending portion 184 of the detent 180 by a spring 191. The spring 191 thus tends to swing the detent 180 to its normal position where it is again ready for engagement by the weight 173. However, since the valve 54 has moved to its closed position, the shoulder 185 at that time is not in position to be engaged by the laterally extending portion 184 of the detent. To open the valve 54 and to move the shoulder 185 into position for engagement by the detent, a reset button 192 is secured on the outer end of the stem of the valve 54. Such button may be pulled outwardly to permit engagement of the detent with the shoulder 185, thus holding the valve 54 open.

The detent 180 may also be disengaged from the shoulder 185 to permit closure of the valve 54 by means of a hand control. To this end, the intermediate portion of the T-shaped detent 180 adjacent the pivot pin 181 is provided with a lug 193. The lug 193 is engageable by a semicircular cam boss 194 provided on the end of a member 195 rotatably mounted in the bracket 182. The member 195, at its outer end, carries a manually operable lever 196 by which the member 195 may be rotated. The free end of the lever 196 is adapted for connection with a cable, by which it may be operated. Upon rotation of the member 195, the cam boss 194, by its engagement with the lug 193, causes swinging movement of the detent 180 about its pivot pin 181 to disengage the detent from the shoulder 185. Thus, closure of the valve 54 may be effected manually. Resetting of the valve 54 and the detent 180 is effected in the same manner as described above.

Figure 11:
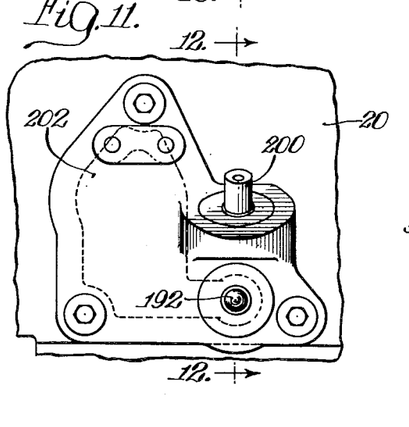
Fig. 11 is a view similar to Fig. 9 but showing a modified form of construction.
Figure 12:
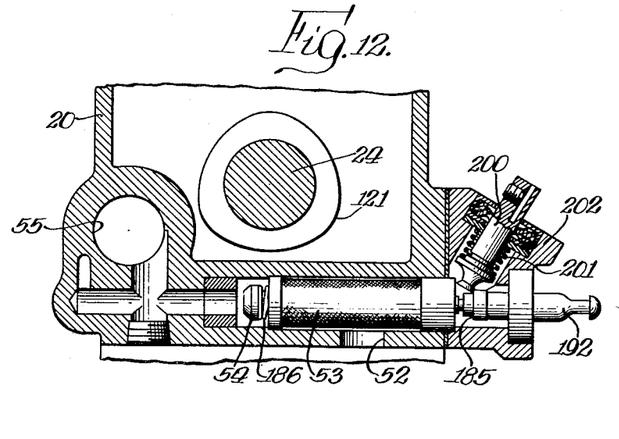
Fig. 12 is a fragmentary sectional view taken on the line 12—12 of Fig. 11.

The overspeed stop device which may be operated only manually, for use in trucks, is shown in Figs. 11 and 12. In this instance, the valve 54 is provided with the nut having the shoulder 185 and with the stem reset button 192. The detent in this instance, however, comprises a plunger 200 angularly positioned relative to the valve stem and urged into engagement with the shoulder 185 by a spring 201. The plunger is slidably mounted in a bracket 202 and extends outwardly therefrom so that its outer end may be connected to a manually operable cable or the like. After operation of the plunger 200 to disengage it from the shoulder 185, the spring-operated valve 54 closes under the action of its spring. For resetting, the spring 201 urges the plunger 200 inwardly toward the shoulder 185 and, as soon as the reset button 192 is pulled to open the valve 54, the plunger 200 will reengage the shoulder 185 and hold the valve 54 in its open position.

I claim:

1. A distributor for a fuel feeding apparatus for an internal combustion engine, said distributor comprising a pair of rotary devices, one of said devices being adapted to be connected to a fuel metering pump and to the cylinders of the engine for distributing to the respective cylinders the fuel delivered by said pump, the other of said devices comprising a stationary disc and a rotatably driven disc in face-to-face engagement, said stationary disc having a pair of passages respectively adapted to be connected to a source of fuel under pressure and to said pump and a plurality of openings extending from said passages to its engaged face, said driven disc having an annular passage and a plurality of openings extending therefrom to its engaged face and adapted to successively and intermittently register with the openings in the stationary disc to intermittently connect said source with said pump.

2. A distributor for a fuel feeding apparatus for an internal combustion engine, said distributor comprising a pair of stationary discs mounted in spaced concentric relation to each other, a pair of rotatable discs interposed between said stationary discs concentrically therewith and in spaced relation to each other, a drive shaft extending through one of said stationary discs and connected to both of said rotatable discs, and a spring interposed between and bearing against said rotatable discs for holding them in face-to-face engagement with the respective stationary discs, one of said stationary discs and its associated rotatable disc having passages adapted upon rotation of said shaft to intermittently connect a source of fuel under pressure with a metering pump, and the other of said stationary discs and its associated rotatable disc having passages adapted for intermittently connecting said pump with the respective cylinders of the engine.

3. A distributor for a fuel feeding apparatus for an internal combustion engine, said distributor comprising a pair of stationary discs mounted in spaced concentric relation to each other, a pair of rotatable discs interposed between said stationary discs concentrically therewith and in spaced relation to each other, a shaft splined throughout its length and having a driving gear mounted on one end thereof, said shaft extending through one of said stationary discs and its associated rotatable disc and connected to the latter, the other end of said shaft being connected to the other rotatable disc, and a coiled spring extending about said shaft and bearing at its respective ends against said rotatable discs to hold them in face-to-face engagement with the respective stationary discs, one of said stationary discs and its associated rotatable disc having passages intermittently moved into register to connect a source of fuel under pressure with a metering pump, and the other of said stationary discs and its associated rotatable disc having passages intermittently moved into register to connect said pump with the respective cylinders of the engine.

4. A distributor for supplying fuel from a source of fuel under pressure to a fuel metering pump and from said pump to the respective cylinders of a multicylinder internal combustion engine, said distributor comprising a pair of rotary devices, one adapted to be connected to said pump and to the cylinders for intermittently supplying fuel to the respective cylinders, and the other device being adapted to connect said pump with said source intermediate the periods when said pump is connected to the respective cylinders by said one device, said other device comprising a stationary disc having two passages, one adapted to be connected to said source and the other adapted to be connected to said pump, each passage having a set of holes opening at one face of the stationary disc with the holes of the two sets arranged in an annular series, and a rotatably driven disc in face-to-face engagement with said stationary disc and having a passage provided with an annular series of holes opening at the engaging face of said driven disc, the holes in both of said annular series being positioned so that a plurality of holes in said driven disc are simultaneously moved into and out of register with a plurality of holes of each of the passages in said stationary disc, whereby fuel may flow freely from said source to said pump through said passages during the angle of rotary movement of said driven disc required for moving the holes into and out of register.

HANS L. KNUDSEN.

References Cited in the file of this patent

UNITED STATES PATENTS

| Number | Name | Date |
| --- | --- | --- |
| 1,739,747 | Aslakson | Dec. 17, 1929 |
| 1,846,654 | Prechtel | Feb. 23, 1932 |
| 1,874,890 | Burton | Aug. 30, 1932 |
| 2,001,126 | Cummins | May 14, 1935 |
| 2,210,067 | Cummins | Aug. 6, 1940 |
| 2,274,609 | Edwards | Feb. 24, 1942 |
| 2,283,242 | Van Der Walt | May 19, 1942 |
| 2,322,181 | Vincent | June 15, 1943 |
| 2,361,399 | High | Oct. 31, 1944 |